CODE TRANSMITTER-DISTRIBUTOR WITH MEANS FOR VARYING DURATION OF STOP PULSE

Original Filed July 31, 1964 Sheet 1 of 2

INVENTOR
ROGER A. SCHMIT
BY R C Terry
ATTORNEY

United States Patent Office

Re. 26,577
Reissued Apr. 29, 1969

26,577

CODE TRANSMITTER-DISTRIBUTOR WITH MEANS FOR VARYING DURATION OF STOP PULSE

Roger A. Schmit, Northbrook, Ill., assignor to Teletype Corporation, Skokie, Ill., a corporation of Delaware Original No. 3,351,711, dated Nov. 7, 1967. Ser. No. 386,556, July 31, 1964. Application for reissue Feb. 9, 1968, Ser. No. 706,201

Int. Cl. H04l *5/24*

U.S. Cl. 178—53.1 11 Claims

Matter enclosed in heavy brackets [ ] appears in the original patent but forms no part of this reissue specification; matter printed in italics indicates the additions made by reissue.

ABSTRACT OF THE DISCLOSURE

In a telegraph transmitter-distributor of the type including a continuously rotating drive shaft, a reader shaft, a distributor shaft and single revolution clutches for selectively coupling the reader and distributor shafts to the drive shaft and further including means for normally causing the reader clutch to continuously couple the reader shaft to the drive shaft and means on the reader shaft for causing the distributor clutch to couple the distributor shaft to the drive shaft once during each rotation of the reader shaft, a device for causing the distribution of characters having long duration stop pulses including a speed reducer gear set driven by the drive shaft and means driven by the low speed portion of the gear set for engaging the reader clutch a predetermined time after the end of each rotation of the reader shaft thereby delaying the coupling of the distributor shaft to the drive shaft and thereby delaying the termination of the stop pulse of each previously distributed character.

Telegraph distributors typically include a shaft which is connected by a clutch to a constantly driven power source. On the shaft are mounted a plurality of cams which have their high or actuating portions distributed at equally spaced points around the periphery of the shaft. Mounted for individual actuation by the cams are pairs of contacts, one contact of each pair being connected to the telegraph line and the other being connected to the output of a telegraph transmitter.

When the clutch is tripped the shaft begins to rotate with the constantly driven power source. Shortly after the initiation of the rotation none of the contacts is closed and a start pulse or bit, which is a spacing (no current) bit, is entered on the telegraph line. During the next portion of the shaft's rotation a plurality, usually five or eight in number, of character contacts are closed sequentially and a character, which is made up of permutation combinations of marking (current) and spacing (no current) bits, is serialized on the telegraph line. During the final portion of the shaft's rotation a stop pulse contact pair is closed and a marking (current) pulse or bit is entered on the telegraph line. If another character is to be serialized on the line immediately the clutch will again be triped and the shaft will revolve to the start segment without stopping; however, if no character is to be distributed the shaft will come to rest in the stop position and the stop pulse (current) will remain on the line.

As will be apparent from the above, the duration of each of the start pulses, the character pulses and the stop pulse is governed by the length of time the contacts are actuated. Usually the start pulse and all of the character pulses are of equal duration while the stop pulse is either of the same or longer duration, depending on the type of telegraph equipment with which the distributor is being used. It should be appreciated that once the duration of the stop pulse has been set, any change thereof in order to accommodate the distributor to some different type of telegraph apparatus than that for which it was originally designed is very time consuming and costly since the distributor must be completely disassembled and all the cams changed and realigned.

Accordingly, an object of this invention is to provide a simple and inexpensive mechanism for controlling the duration of the stop pulse of a telegraph distributor.

Another object of this invention is to provide a mechanism for controlling the duration of the stop pulse of telegraph transmitter-distributors which may be constructed from a small number of simple and common parts.

A further object of this invention is to provide a telegraph transmitter-distributor which serializes, on a telegraph line, permutation code combinations having stop pulses of more than one duration.

A still further object of this invention is to provide a telegraph transmitter-distributor in which the duration of the stop pulse of the permutation code combination which is serialized on the telegraph line may be changed without disassembling the device.

In the preferred embodiment of the present invention these objects are achieved by delaying the tripping of the reader clutch for a predetermined length of time in each cycle of the apparatus. This is accomplished by providing a pinion gear on the continuously rotating power shaft of the transmitter-distributor and a gear driven by the pinion which drives a cam that in turn closes a pair of contacts once per revolution of the gear. The reader shaft clutch tripping circuit, which is normally continuously closed, is connected through the contacts so that the reader shaft, which, through a cam and contact mechanism normally causes the distributor shaft clutch to be tripped in such a manner that the distributor shaft rotates continuously, will not be continuously rotated but instead will come to rest at the end of each revolution and will remain at rest until the gear completes its revolution, whereupon the contacts will be closed and the reader shaft clutch will again be tripped. The stopping of the reader shaft until the gear completes its revolution will cause the distributor shaft to come to rest in its stop position for an amount of time equal to the amount of time the reader shaft is stopped and, since the distributor shaft puts a stop pulse on the line when in its stop position, the stopping of the distributor shaft will cause the stop pulse to be lengthened.

A more complete understanding of the present invention may be had by referring to the following detailed description when considered in conjunction with the accompanying drawings wherein.

Figure 1:
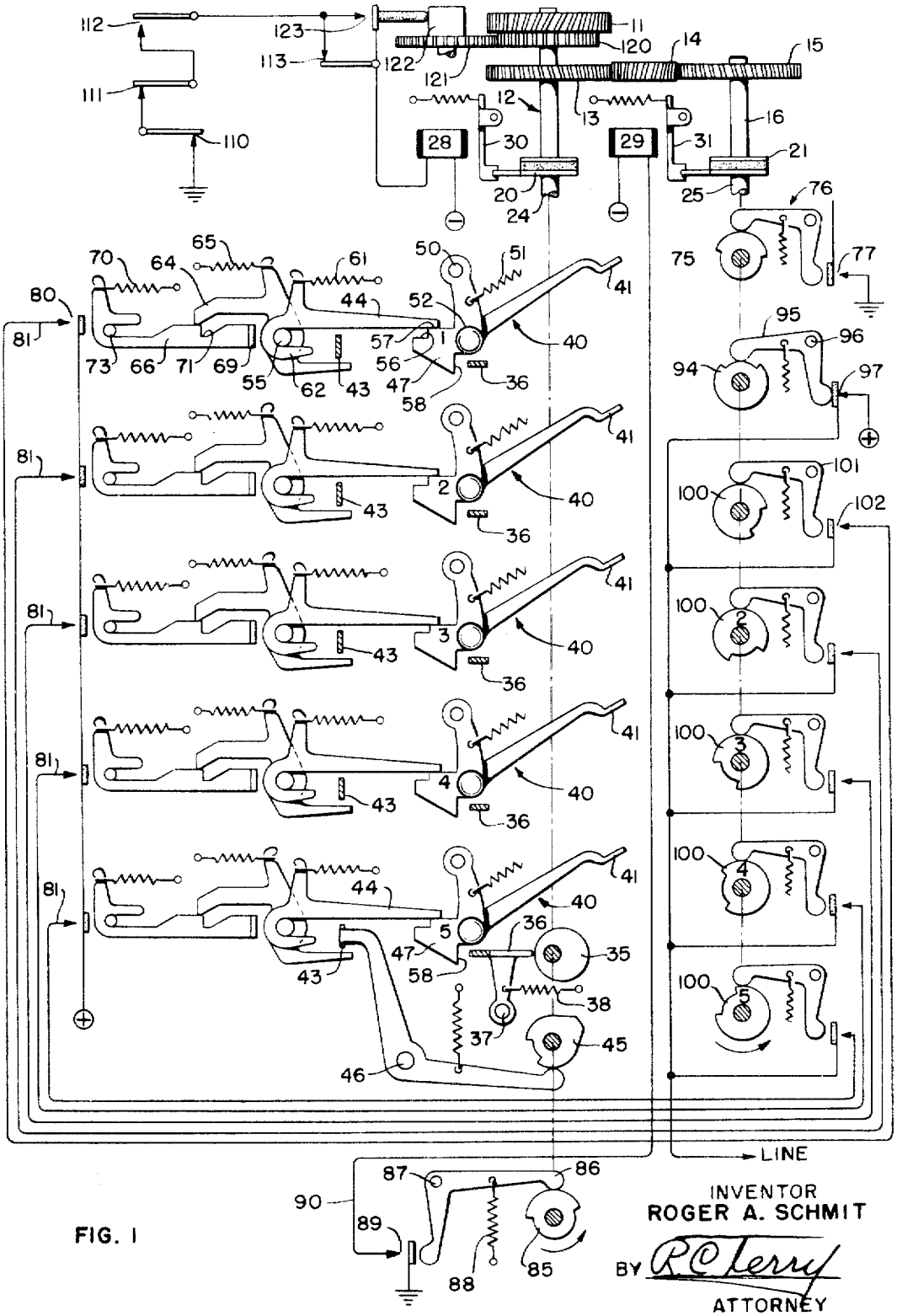
FIG. 1 is a schematic view of a telegraph transmitter-distributor employing the present invention.

Referring now to FIG. 1 there is illustrated a schematic representation of a telegraph transmitter-distributor of the tape-controlled type. A gear 11 is provided through which power may be supplied to the transmitter-distributor from a motor (not shown). Gear 11 is mounted on a shaft 12 which is continuously rotated by the gear 11. Also mounted on shaft 12 is a gear 13 which is in mesh with an idler gear 14 which is in turn in mesh with a gear 15 mounted on a shaft 16. Gears 13, 14, and 15 are constructed so that shafts 12 and 16 rotate at equal angular velocities.

A pair of clutches 20 and 21 are provided for connecting a reader shaft 24 and a distributor shaft 25 to the shafts 12 and 16, respectively. Thus, it may be seen that when the clutches 20 and 21 are tripped, the shafts 24 and 25 rotate at equal angular velocities, this velocity being the same as the angular velocity of gear 11. Clutches 20 and 21 are of the single revolution type and are actuated by electromagnets 28 and 29 through their respective armature and linkage assemblies 30 and 31. Thus, when power is supplied to either magnet 28 or magnet 29 its respective armature and linkage assembly 30 or 31 will be attracted toward the magnet and its respective clutch 20 or 21 will be tripped, thereby coupling its respective shaft to the power supply for one revolution. Clutches 20 and 21 are shown schematically as friction type clutches for simplicity of disclosure but preferably are clutches of the type disclosed in the U.S. Patent No. 2,566,031, granted to A. N. Nilson on Aug. 28, 1951.

Shaft 24 serves to drive the reader assembly which is shown on the left-hand side of FIG. 1. Mounted on shaft 24 is a cam 35 which serves to rock a sensing lever bail 36 counterclockwise (FIG. 1) around the pivot 37 against the action of spring 38. Sensing lever bail 36 extends under and adjacent to a plurality of sensing levers 40 which are used to sense holes or the absence thereof in a punched paper tape (not shown). With the various parts of the reader assembly in the position shown in FIG. 1, a stripper bail 43, which extends the length of the reader assembly under a series of pusher levers 44, has just been actuated upwardly by a cam 45 thereby disengaging the pusher levers from latching portions 47 of the sensing levers 40, an operation which will be more fully understood by the description which follows. At this time a plurality of sensing pins 41 on the sensing levers 40 are ready to sense the punched paper tape. As cam 35 revolves it allows the sensing lever bail 36 to rock clockwise around the pivot 37 under the action of spring 38 thereby allowing the sensing levers 40 to individually rock counterclockwise around a common pivot 50 under the action of springs 51. The sensing levers 40 are pivotally attached at a pivot center 52 to the latching portions 47 of the sensing levers 40 so that as the latching portion rocks counterclockwise the sensing pins 41 may travel in a substantially straight line, being guided by holes in a top plate (not shown). As the sensing pins 41 move upwardly under the action of their respective springs 51, they either pass through the paper tape or are blocked by the imperforate tape depending on the character which is represented in the tape by the permutation of holes. Those sensing pins 41 which pass through the tape will allow their latching portions 47 to rock a relatively large distance around the pivot 50 and their pusher levers 44 will rock around a pivot shaft 55 under the action of spring 61 and will fall into a notch 56 of the latching portion 47. However, [in] *if* the sensing pins 41 on the sensing levers 40 do not pass through the tape, but are instead blocked thereby, the latching portions 47 will not rock about the pivot 50 far enough to allow the pusher levers 44 to fall into the notches 56. Thus, the permutation combination present in the punched paper tape is transferred to the pusher levers 44, the holes being represented by those pusher levers which are engaged with the notches 56 and the solid portions of the tape being represented by those pusher levers which remain on the upper surfaces 57 of the latching portions 47.

After the pusher levers 44 are thus selected for actuation the high portion of the cam 25 will cause the sensing lever bail 36 to rock counterclockwise around the pivot 37 against the action of spring 38. The sensing lever bail 36 engages a surface 58 on each of the latching portions 47 and forces each of the latching portions 47 to rock clockwise around the pivot 50 against the action of springs 51. This mechanism causes the sensing pins 41 to move downwardly out of engagement with the tape and allows a feed mechanism (not shown) to advance the tape to the next position to be read. This mechanism also causes any of the pusher levers 44 which have previously been engaged with the notch 56 to be driven leftwardly against the action of their springs 61, the pusher levers being guided on the pivot 55 by their slotted portions 62. The rocking of the latching portions 47 around the pivot 50 will not, however, cause movement of the pusher levers which have remained on the upper surfaces 57 but instead will allow the surfaces 57 to slide along the pusher levers 44 without affecting them.

Shortly after the selected pusher levers 44 start to move to the left (FIG. 1) the stripper bail 43 is rocked counterclockwise about a pivot 46 by a cam 45 on the shaft 24 to rock a series of latches 64 clockwise against the action of their individual springs 65. The latches 64 are oscillatable about the pivot 55 and are individually associated with a plurality of contact bails 66 aligned with the pusher levers 44. Notches 71 are formed in the contact bails 66, into which the latches 64 are urged by their springs 65 and when the stripper bail 43 is rocked counterclockwise it will disengage the latches 64 from notches 71 and unlatch any of the contact bails 66 which had been latched by previous operations. As the pusher levers 44 which have been engaged in the notch 56 are moved to the left by the latching portion 47, they come into contact with tabs 69 of the bails 66 and thereby push the contact bails to the left against the action of springs 70. After the contact bails have been moved by the pusher levers 44, the latches 64 drop into the notches 71 of any of the contact bails 66 which have been moved to the left and the bails 66 are latched in the leftward position. The contact bails 66 are guided in their leftward movement by their slotted portions 72 which are engaged with a bar 73 and the latches 64 are driven into the notches 71 by the springs 65.

When the contact bails 66 are moved to and latched in their leftward positions, they cause contact pairs 80 individual to them to be closed. Since the right-hand contact of each of the contact pairs 80 is connected to a voltage supply it may be understood that the permutation code which was present in the paper tape has now been transferred to the wires 81 in the form of positive electrical voltages. It may also be appreciated that the latches 64 retain the contact bails 66 in the leftward position thereby retaining the permutation code combination in the wires 81 until the stripper bail 43 again disengages the latches 64 from the notches 71.

After the contact bails 66 have been latched in position cam 45 causes the stripper bail 43 to rock clockwise about pivot 46 thereby causing the pusher levers 44 to be rocked counterclockwise around the pivot 55 against the action of spring 61. This movement disengages any of the pusher levers 44 which were previously engaged in notches 56 and causes them to come to rest on the upper surface 57 of the latching potrion 47. At this time the reader assembly is ready to begin another operation.

During the same portion of the revolution of the reader shaft 24 that causes cam 45 to drive the stripper bails 43 upwardly thereby disengaging the pusher levers 44 from the notches 56, a cam 85 is also on shaft 24 allows a lever 86 to rock clockwise around a pivot 87 under the actuation of a spring 88. This causes contact pair 89 to be closed which in turn completes a circuit through wire 90 to the clutch magnet 29 to trip the clutch 21, thereby connecting the distributor shaft 25 to the shaft 16 for one revoluion. As the distributor shaft 25 starts to rotate a cam 94 [mouned] *mounted* on the shaft causes its associated lever 95 to rock around its pivot 96 and to open contact pair 97 thereby removing the stop pulse (current or marking condition) from the telegraph line. Immediately following this operation a portion of the distributor shaft's rotation is devoted to the start pulse and at that time no current is placed on the telegraph line. As shaft 25 continues to rotate a series of cams 100 mounted on it sequentially close a series of contacts 102 and the permutation combination which is present in the wires 81 in the form of marking (current) and spacing (no current)

conditions, is serialized on the telegraph line. The construction of the distributor is shown schematically in the right-hand portion of FIG. 1 where it may be seen that each of the cams 100 corresponds to one of the sensing levers 40 and that the indicated portion of each of the cams 100 is sequentially spaced around the periphery of the shaft 25 so that the levers 101 which are actuated by the cams are allowed to close the contact pairs 102 in sequential fashion. After each of the cams and its associated levers and contact pairs have been actuated the cam 94 again allows contact pair 97 to close, thus, again placing the stop pulse on the telegraph line.

As has been described [hreinbefore] *hereinbefore* magnet 29, which controls the revolution of the distributor shaft 25 is controlled by the reader shaft 24 through the operation of cam 85 and its associated lever. The circuit for control- [ling the reader shaft 24 extends through a series of switch] ling the reader shaft 24 extends through a series of switches 110, 111, 112 and 113. During normal operation the disabling switch 113 is closed as are the off-on switch 112, the tight-tape switch 111 and the tape-out switch 110. The tape-out switch 110 serves to stop the reader by disengaging the clutch 20 when there is no paper tape present to be read. The tight-tape switch 111 stops the reader in a similar manner when the paper tape which is presented to the reader becomes too tight and is in danger of being torn by the reader feed mechanism (not shown). The on-off switch 112 is used to turn the reader on and off. Thus, it may be seen that if the reader is turned on and if there is tape present in the reader which is not in too tight a condition and if the disabling switch 113 is closed, the reader shaft clutch 20 is held tripped. This causes the reader to read one character in the tape after another and causes the permutation code combination present in the tape to be transferred to the wires 81. Cam 85, which is driven by the reader shaft and which is used to cause the tripping of the distributor clutch, is arranged in such a way that the distributor shaft 25 is also continuously rotated, thus causing a start pulse, the various character pulses and a stop pulse to be sequentially serialized onto the telegraph line for each character which is read by the reader assembly.

Assuming for a moment that the on-off switch 112 was to be opened, the magnet 28 would be deenergized and the armature and linkage assembly 30 would cause the clutch 20 to disengage reader shaft 24 from shaft 12 as soon as the reader shaft had been revolved to its stop position. In completing its revolution, however, the reader shaft would cause contact pair 89 to be closed and therefore the distributor shaft 25 would be coupled by the clutch 21 to the shaft 16. The distributor shaft 25 would then continue to rotate and would serialize the last character read by the reader assembly on the telegraph line. Since the reader shaft 24 would be in its stop position the cam 85 would not be able to close the contact pair 89 and thus the magnet 29 would not be actuated. Therefore, as soon as the distributor shaft 25 had finished its revolution the armature and linkage assembly 31 would disengage the clutch 21 and the distributor shaft 25 would stop. At this time the cam 94 would be in the position shown in FIG. 1, the lever 95 would have closed the contact pair 97 and a stop pulse would remain on the line.

The circuit [would] *which* contains tape-out switch 110, tight-tape switch 111, on-off switch 112 and disabling switch 113 may also be connected directly to the magnet 29 instead of connecting the magnet to the contact pair 89. In this case a cam 75 is used to control the movements of a lever 76 which in turn controls the closing of a contact pair 77. The output from the contact pair 77 would then be [conneced] *connected* to the input of magnet 28 in the same manner in which wire 90 is connected to magnet 29 in the previously outlined arrangement. When the transmitter-distributor is wired in this manner the reader shaft is said to be "slaved" to the distributor shaft and it should be understood that, in this case, if the circuit which controls the magnet 29 is open, the reader shaft 24 continues to revolve for one more revolution and a character is stored in the wires 81. When the transmitter-distributor is wired in the manner previously outlined, the distributor shaft is said to be "slaved" to the reader shaft and as has been pointed out hereinbefore, in this case the distributor shaft continues to revolve for one revolution after the reader shaft has stopped.

The foregoing description of the transmitter-distributor is given only to show the operation of a typical tape controlled telegraph distributor. A more complete and full understanding of a transmitter-distributor of this type may be had by referring to Bulletin 242B published by Teletype Corporation, Skokie, Ill., copyright 1957. It should be further understood that the transmitter-distributor described herein is only a representative type and that the present invention may be used with virtually any transmitter-distributor.

In accordance with the present invention a timing arrangement is provided, for modifying the cycle of operation, which includes a gear 120 fixed on the shaft 12 and consequently driven at the same speed as the gear 11. The gear 120 drives a gear 121 to which there is attached a cam 122 that closes a contact pair 123 once in each cycle of rotation of the gear 121. If the transmitter-distributor is wired so that the distributor shaft is "slaved" to the reader shaft, it may be seen that when disabling switch 113 is in its open position and when the switches 110, 111, and 112 are closed, the magnet 28 is actuated only when the contact pair 123 is closed. The gear 120 is provided with 50 teeth and the gear 121 is provided with 53 teeth so that gear 121 turns at a slightly slower rotational velocity than does the shaft 12. Thus, when the switch 113 is open and the present invention is in use, the clutch 20 will be tripped, to connect the reader shaft 24 to the shaft 12, only when the contact pair 123 is closed. Once it is connected to the shaft 12, the shaft 24 completes its revolution and causes the various parts of the reader assembly to go through the operations outlined above. Shaft 24 also causes cam 85 to close the contact pair 89 thereby tripping magnet 29 and connecting the distributor shaft 25 to the shaft 16. The distributor shaft 25 will then complete one revolution and distribute the character read by the reader assembly onto the telegraph line. Upon completing one revolution, however, the reader shaft 24 will not continue to read another character out will instead stop and will not again be started until the gear 121 has completed its revolution and has closed contact pair 123. This in turn will cause the distributor shaft to stop for a short time at the end of each cycle until the reader shaft again causes the cam 85 to close the contact pair 89 thereby actuating magnet 29 and tripping clutch 21. Thus, it may be understood that the stop pulse which is serialized on the line by the cam 94, which closes the contact pair 97, will be somewhat longer when the present invention is in use than it would have been had the reader shaft 25 been continuously rotated. If the reader shaft is "slaved" to the distributor shaft the contact pair 123 will be in the circuit of magnet 29. In this case the distributor shaft will stop after each revolution and will remain stopped until gear 121 completes its revolution and closes contact pair 123. At this time clutch 21 will be tripped and distributor shaft 25 will serialize the previously read character on the telegraph line. In so doing shaft 25 will cause clutch 20 to be tripped thereby causing another character to be read.

In the present disclosure a transmitter-distributor for a five-level permutation code is illustrated. Such codes may be thought of as broken up into seven units, one unit being assigned to the start pulse, another to each of the five character pulses which are serialized on the line by the cams 100 and a last unit being assigned to the stop pulse which is placed on the line by the cam 94 and the contact pair 97. In the usual start-stop permutation code used in printing telegraphy the start pulse and the character pulses are of equal duration and their length is usually thought of as being one unit. However, the stop pulse may be either one unit or longer depending on the type of equipment with which the distributor is being employed. As may be appreciated from the above description of the distributor, once a given stop pulse unit has been selected it is very difficult to change to another stop pulse length since the entire periphery of the distributor shaft 25 has been utilized for the start pulse, the character pulse and the stop pulse. In order to change from one stop pulse length to another, the cams 94 and 100 would have to be removed from the distributor shaft and replaced by different cams which close their associated contacts for different lengths of time. The cams would then have to be realigned so that the new stop pulse would take up the correct portion of the distributor shaft's periphery. However, when the present invention is employed this need not be done but instead the stop, pulse may be changed at will without changing any of the cams or their relationship to one another. For example, if the code distributed by the distributor shown at the right side of the FIG. 1 is taken to have equal duration for the start pulse, the character pulses and the stop pulse, that duration being assumed to be one unit in length, the stop pulse may be changed to have a duration of 1.42 units by employing a gear 120 having 50 teeth and a gear 121 having 53 teeth. The stop pulse duration may have other values than 1.42 unit by simply changing the number of teeth in gear 120 and gear 121 and, more than one alternative stop pulse duration may be provided by employing more than one set of gears 120 and 121, cam 122 and contact pairs 123.

Figure 2:
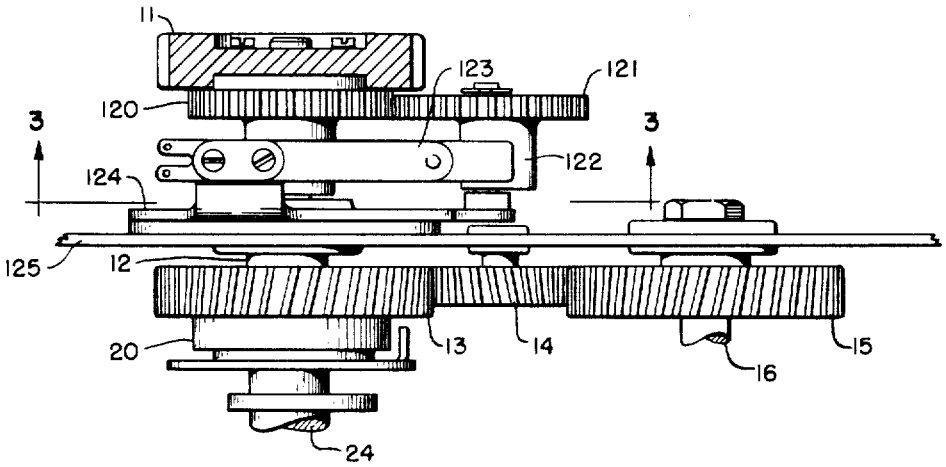
FIG. 2 is a top view of a mechanism which could be attached to a telegraph transmitter-distributor and could thereby be used to carry out the present invention.
Figure 3:
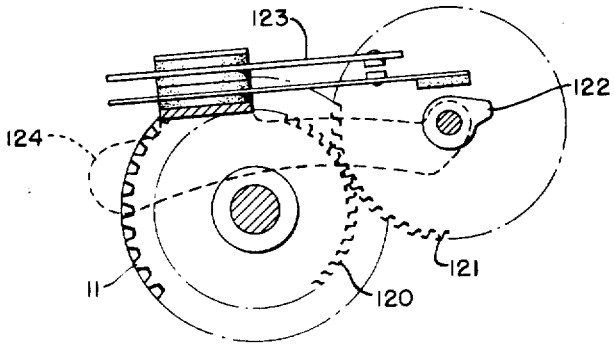
FIG. 3 is a front view of such a mechanism.

In FIGS. 2 and 3 there is shown a mechanism for carrying out the present invention which may be employed on transmitter-distributor which is described in the abovementioned bulletin. In FIG. 2 there is shown a gear 11, shaft 12, gears 13, 14, and 15, clutch 20 and shaft 24 together with gear 120, gear 121, cam 122 and contact pair 123. In FIG. 3 there is also shown gear 11, gear 120, gear 121, cam 122 and contact pair 123. The addition to the transmitter-distributor which is described in the abovementioned bulletin consists of gears 120 and 121, the cam 122 and the contact pair 123 which is supported by a stop support 124 which may be attached to the side frame 125 of the transmitter-distributor. Thus, it may be seen that by adding a small number of common and simple parts the length of the stop pulse which is serialized on the telegraph line by the distributor may be easily controlled and that this control may be provided without the necessity of disassembling the distributor.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. In a telegraph transmitter-distributor of the start-stop type having, a continuously rotating power shaft, a reader assembly including a reader drive shaft for actuation by the power shaft, a reader clutch for connecting said reader drive shaft to the power shaft to drive the reader drive shaft at the same rotational velocity as the power shaft, a distributor assembly including a distributor drive shaft for actuation by the power shaft, a distributor clutch for connecting said distributor drive shaft to the power shaft to drive he distributor drive shaft at the same rotational velocity as the power shaft, means driven by the distributor drive shaft for serializing on the output of the distributor assembly one start-stop code combination having a stop pulse of a given duration during each rotation of the distributor drive shaft, means driven by one assembly for tripping the clutch of the other assembly, and normally continuously operated means for tripping the clutch of said one assembly;

a mechanism for increasing the duration of the stop pulse comprising:

a speed reducer having a high speed portion driven by the power shaft and having a low speed portion driven by the high speed portion;

intermittently operated means actuated by the low speed portion of the speed reducer for tripping the clutch of said one assembly and;

means for disabling the continuously operated means to put the tripping of the clutch of said one assembly under the control of the intermittently operated means so that the clutch of said one assembly is tripped only after said one assembly has come to rest in its stop position.

2. The mechanism according to claim 1 wherein the normally continuously operated means includes an electromagnet and a source of electric potential, wherein the intermittently operated means is a normally open contact pair which is cyclically closed by the low speed portion of the speed reducer and wherein the disabling means is a switch which connects the source of electric potential to the electromagnet through either of two paths, the first of which connects the source of electric potential directly to the electromagnet and the other of which connects the source of potential to the electromagnet through the contact pair.

3. In a telegraph transmitter-distributor of the start-stop type having, a continuously rotating power shaft, a distributor assembly including a distributor drive shaft for actuation by the power shaft, a distributor clutch for connecting said distributor drive shaft to the power shaft to drive the distributor drive shaft at the same rotational velocity as the power shaft, means driven by the distributor drive shaft for serializing on the output of the distributor assembly one start-stop code combination having a stop pulse of a given duration during each rotation of the distributor drive shaft, clutch tripping means for tripping the clutch; and normally continuously operated means for causing the clutch tripping means to trip the clutch;

a mechanism for lengthening the stop pulse including:

a speed reducer having a high speed portion driven by the power shaft and having a low speed portion driven by the high speed portion;

intermittently operated means actuated by the low speed portion of the speed reducing means once per revolution of the low speed portion of the speed reducing means for causing the clutch tripping means to trip the clutch; and means for disabling the normally continuously operated means to put the tripping of the clutch under the control of the intermittently operated means whereby the clutch is tripped only after a stopping of the distributor assembly in its stop position.

4. The device for increasing the elngth of a stop pulse according to claim 3 wherein the normally continuously operated means includes a source of electric potential and an electromagnet, wherein the intermittently operated means includes a normally open switch which is periodically closed by the low speed portion of the speed reducer and wherein the disabling means is a second switch which connects the electromagnet to the source of electric potential through at least two paths one of which connects the source of potential directly to the electromagnet and the other of which connects the source of potential to the magnet through the normally open switch.

5. In a telegraph transmitter-distributor of the start-stop type having, a continuously rotating power shaft, a reader assembly including a reader drive shaft for actuation by the power shaft, a reader clutch for connecting said reader drive shaft to the power shaft to drive the reader drive shaft at the same rotational velocity as the power shaft, a distributor assembly including a distributor drive shaft for actuation by the power shaft, a distributor clutch for connecting said distributor drive shaft to the power shaft to drive the distributor drive shaft at the same rotational velocity as the power shaft, means driven by the distributor drive shaft for serializing on the output of the distributor assembly one start-stop code combination having a stop pulse of a given duration during each rotation of the distributor drive shaft, means driven by one of said assemblies for tripping the clutch of the other assembly, and a normally continuously operating means for tripping the clutch of said one assembly;

means for increasing the duration of the stop pulse comprising:

stop pulse control means connected to and driven by said power shaft through a predetermined fraction of a cycle of rotation for each complete rotation of the power shaft;

means actuated by said stop pulse control means once in each complete cycle of rotation of said control means for tripping the clutch of said one assembly; and means for disabling said normally continuously operated tripping means to render said stop pulse control means effective.

6. A telegraph transmitter-distributor of the start-stop type including;

a power means, a transmitter driving means, a distributor driving means, clutches individual to said driving means for connecting them to the power means for operation at the same speed, means for maintaining one of said clutches continuously operated to maintain one driving means operated, means actuated by said one driving means in each of its cycles of operation for operating the other of said clutches, a pulse duration extending means driven by said power means through a portion of a complete cycle in each cycle of said distributor or transmitter driving means, and means for switching the control of said other clutch from the means actauted by the other driving means to the pulse duration extending means for operation once in each cycle of the extending means.

7. A device for controlling telegraph distributors including:

a distributor;

means for operating the distributor through cycles of operation of a predetermined period;

starting means for causing the operating means to start each cycle of operation of the distributor coincidentally with the end of the next preceding cycle;

delay means [driven by the operating means] for causing the operating means to start each cycle of operation of the distributor a predetermined time after the end of the next preceding cycle, and means for selectively starting the distributor by the starting means and by the delay means.

8. The device according to claim 7 wherein the starting means normally causes the distributor to operate continuously, wherein the delay means is a cyclically operated device having a period of operation longer than the period of operation of the distributor and wherein the selective means causes the delay means to start the distributor once per cycle of operation of the delay means.

9. A telegraph transmitter-distributor for serializing permutation coded characters each comprised of a predetermined number of binary information bits preceded by a start pulse and followed by a stop pulse including:

means for temporarily storing a character to be serialized;

means having a predetermined cycle of operation for supplying a character to the storing means;

means for causing continuous cyclical operation of the supplying means;

cyclically operated means normally applying a stop pulse to the telegraph line for serializing the characters stored in the storing means;

means responsive to at least part of a cycle of operation of the supplying means for starting a cycle of operation of the serializing means; and means for delaying initiation of each new cycle of operation of the supply means for a predetermined period of time and thereby delaying the start of a cycle of operation of the serializing means for the predetermined period of time.

10. The device according to claim 9 wherein the delaying means is operated by the means for causing continuous cyclical operation of the starting means through cycles of operation of longer period than the cycles of operation of the supplying means and wherein the delaying means initiates a new cycle of operation of the starting means at the end of each delaying means cycle.

*11. A signal transmission device including:*

*a cyclically operating signal serializer;*

*means for starting each cycle of operation of the serializer at the end of the next preceding cycle thereby operating the serializer continuously;*

*cyclically operable means having a cycle of operation different from the cycle of the serializer, and*

*means for selectively starting each cycle of operation of the serializer at a predetermined point in each cycle of operation of the cyclically operable means thereby changing the length of the cycle of operation of the serializer.*

References Cited

The following references, cited by the Examiner, are of record in the patented file of this patent or the original patent.

UNITED STATES PATENTS

| | | | |
|---|---|---|---|
| 2,945,092 | 7/1960 | Gardberg | 178—53.1 |
| 2,968,693 | 1/1961 | Gaffney et al. | 178—53.1 |

ROBERT L. GRIFFIN, *Primary Examiner.*

J. A. ORSINO, Jr., *Assistant Examiner.*